United States Patent [19]

Iwasawa

[11] Patent Number: 4,510,423
[45] Date of Patent: Apr. 9, 1985

[54] MOTOR APPARATUS

[75] Inventor: Teruo Iwasawa, Tokyo, Japan

[73] Assignee: Olympus Optical Co., Ltd., Tokyo, Japan

[21] Appl. No.: 402,726

[22] Filed: Jul. 28, 1982

[30] Foreign Application Priority Data

Aug. 12, 1981 [JP] Japan .................... 56-126359

[51] Int. Cl.³ .................................. G05B 5/00
[52] U.S. Cl. .................... 318/331; 318/345 B;
 318/345 F; 318/459; 318/326
[58] Field of Search ............ 318/326, 319, 327, 328,
 318/331, 345 B, 345 AB, 345 F, 461-464, 459

[56] References Cited

U.S. PATENT DOCUMENTS

| 3,475,672 | 10/1969 | Oltendorf | 318/331 X |
| 3,543,115 | 11/1970 | Grygera | 318/327 X |
| 3,599,063 | 8/1971 | Nanai et al. | 318/327 |
| 4,097,789 | 6/1978 | Doemen | 318/461 |
| 4,163,182 | 7/1979 | Tanikoshi | 318/331 |
| 4,215,298 | 7/1980 | William, Jr. et al. | 318/327 |

FOREIGN PATENT DOCUMENTS 2021507 11/1970 Fed. Rep. of Germany .
2064401 7/1972 Fed. Rep. of Germany .

OTHER PUBLICATIONS

W. L. McDougal et al., Direct Current Motors and Generators, American Technical Society, Chicago, pp. 255-263, 1947.
J.S.C. Tan, D.C. Servo-System with Torque Feedback, Control, 12/68.

Primary Examiner—Ulysses Weldon
Attorney, Agent, or Firm—Frishauf, Holtz, Goodman & Woodward

[57] ABSTRACT

A motor apparatus includes a motor, a first circuit for sensing a back electromotive force of the motor to provide a first signal, a second circuit for sensing a rotation speed of the motor to provide a second signal, a third circuit responsive to the first and second signals to provide a third signal corresponding to the first and second signals, and a fourth circuit for feeding to the motor a drive current with a magnitude corresponding to the third signal.

The motor and the first to fourth circuits jointly form a negative feedback loop for setting up a proportional relationship of the second signal to the product of rotation speed and output torque of the motor. The second circuit changes the second signal proportionally to the rotation speed of the motor.

17 Claims, 7 Drawing Figures

F I G. 6
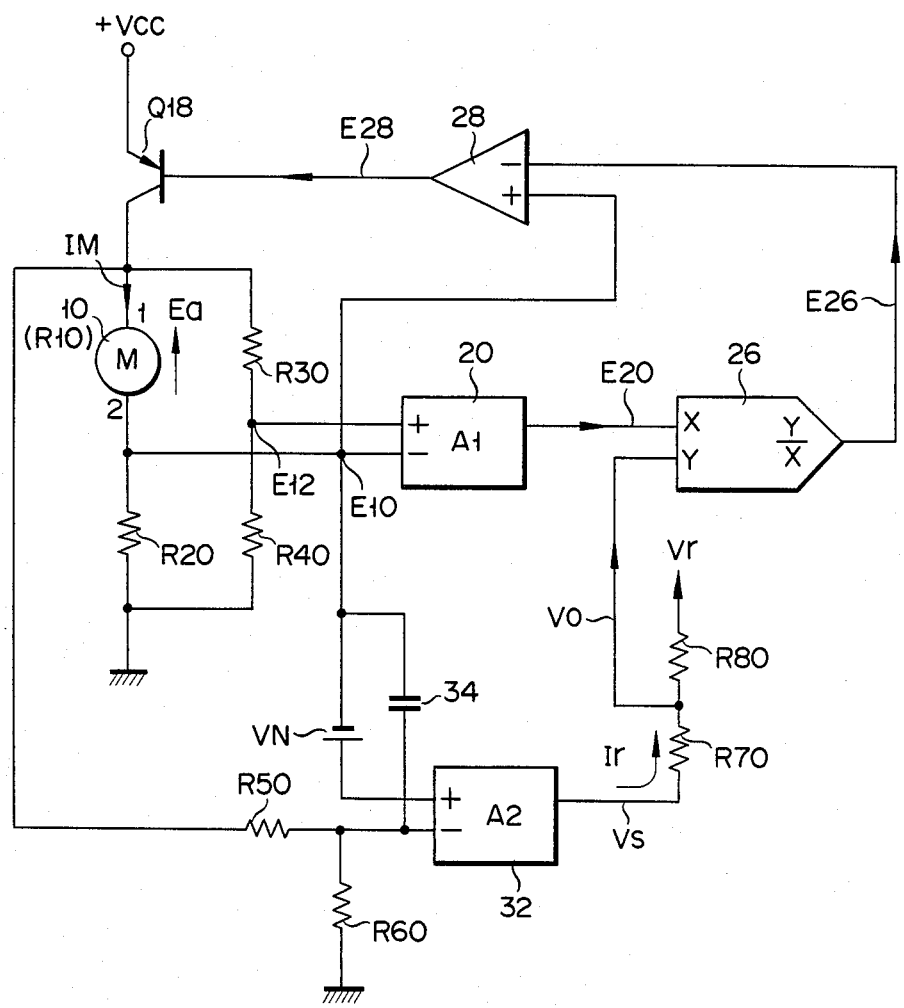

MOTOR APPARATUS

BACKGROUND OF THE INVENTION

The present invention relates to a motor apparatus for driving a motor at a fixed torque.

A smooth rotation with little torque change is required for motors used for tape transportation of tape recorders. The reason for this is that the torque change, or torque ripple, causes wow/flutter. One of the suitable methods to reduce the wow/flutter is to use a flywheel with a large inertia mass. The use of a large flywheel, however, prevents reduction of the size and weight of a tape recorder, makes slow the response of start/stop operation, and increases the products cost. For this reason, there is a great demand to satisfy a desired wow/flutter characteristic using a small-sized flywheel or, if possible, not using a flywheel. The best way is to reduce with torque ripple of the motor as low as possible, or to make the torque of the motor constant.

The requirement of torque ripple reduction is not necessarily applied only to a motor actuated with a constant rotation speed such as a capstan motor. Another motor requiring the reduction of the torque ripple is a disc rotation drive apparatus in which the rotating speed is faster as it is closer to the inner periphery of the disc so that its tangential velocity is made constant. Such an apparatus is applied to an optical disc system for recording and reproducing digital signals, which has recently been put into practice. In order to obtain a smooth rotation in the system, to torque of the motor used must be constant irrespective of the rotation speed being varied. In addition to the above system, use of the torque rippleless motor is frequently desired in an apparatus with a plurality of constant speeds. So far as the applicant knows, no torque rippleless motor applicable for actual products is available, except some specially designed motors.

SUMMARY OF THE INVENTION

Accordingly, an object of the present invention is to provide a motor apparatus which is operative at a fixed torque irrespective of rotation speed of the motor.

To achieve the above object, in a motor apparatus according to the present invention, the product NT of a rotation speed N of the motor and an output torque T of the motor is controlled so as to be proportional to a given signal Vo. Further, the signal Vo is proportional to the rotation speed N; NT=k1Vo and N=k2Vo where k1 and k2 are proportional constants. Arranging these equations, we have T=k1Vo/N=k1Vo/k2Vo=k1/k2. Thus, the output torque T is constant (k1/k2) and independent of the rotation speed N. Therefore, wow/flutter can be reduced without increasing the inertia mass of the rotating system of the motor. Accordingly, the present invention provides a motor apparatus which is small in size and light in weight and with a quick start/stop response.

BRIEF DESCRIPTION OF THE DRAWINGS

FIGS. 5 and 6 respectively show circuit diagrams of other embodiments of a motor apparatus according to the present invention.

DETAILED DESCRIPTION OF THE PREFERRED EMBODIMENTS

Embodiments of a motor apparatus according to the present invention will be described referring to the accompanying drawings.

Figure 1:
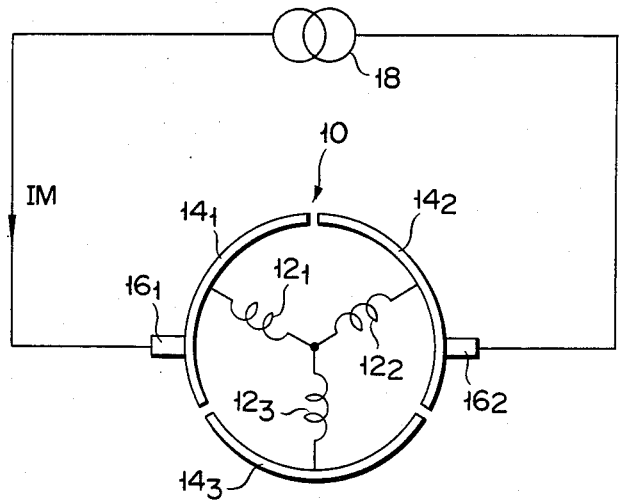
FIG. 1 shows a schematic diagram of a DC motor of the 3-phase Y-connection type to which the present invention is applicable.

FIG. 1 shows a constant-current driven motor 10. The motor 10 as a DC motor of the 3-phase Y-connection type is provided with armature coils $12_1$ to $12_3$, commutators $14_1$ to $14_3$ and brushes $16_1$ and $16_2$. A drive current $I_M$ fed from a current source 18 flows through the brush $16_1$ and the commutator $14_1$ to the coil $12_1$. The current $I_M$ flowing into the coil $12_1$ passes through the coil $12_2$ and then through the commutator $14_2$ and the brush $16_2$ to return to the current source 18.

Suppose that an angle formed between the brushes $16_1$ and $16_2$ is 180° and the magnetic field system (not shown) is a two pole system consisting of N and S, and a conduction angle of the Y connection coils $12_1$ to $12_3$ is 120°. Intensities of the magnetic fields generated by respective excited coils $12_1$ to $12_3$ are H1 to H3. A back electromotive force Ea given by the following equation is generated between the brushes $16_1$ and $16_2$.

$$Ea = K1N(H1 + H2 + H3) \qquad (1)$$

In the equation (1), N denotes a rotating speed of the moto 10 and K1 denotes a proportional constant. This equation is derived from Lenz's law. The output torque T of the motor 10 is given by the following equation $$T = K2 \cdot I_M(H1 + H2 + H3) \qquad (2)$$

where $I_M$ is an armature current and K2 is a proportional constant. This equation is derived from Fleming's left-hand rule. In the equation (2), the intensities of the electromagnetic fields H1 to H3 change with a variation of the magnetization of the field electromagnet and with an angular position of the armature. Therefore, even if the current $I_M$ is fixed, the actual output torque is not fixed.

Figure 2:
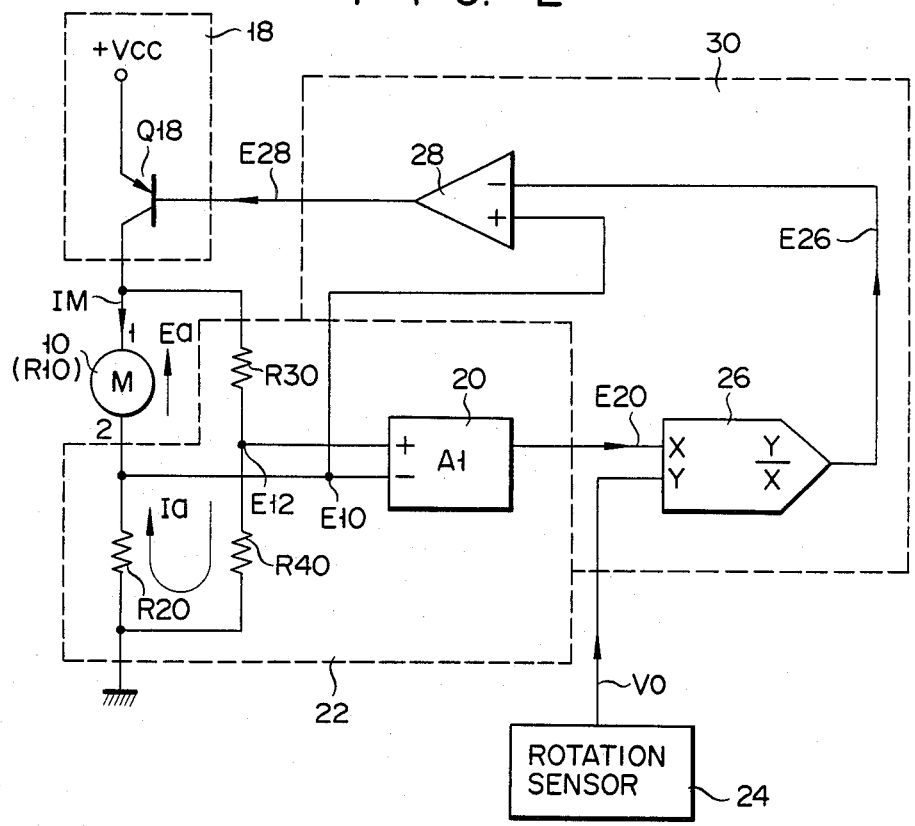
FIG. 2 shows a circuit diagram of a motor apparatus which is an embodiment of the present invention.

FIG. 2 shows an arrangement for making constant the motor output NT and the output torque T. The motor 10 is connected at one end 2 to ground through a resistor R20. The other end 1 of the motor 10 is grounded through resistors R30 and R40. A connection point between the motor 10 and the resistor R20 is connected to the inverting input terminal of an amplifier 20. A connection point between the resistor R30 and the resistor R40 is connected to the noninverting input terminal of the amplifier 20. The output terminal of the amplifier 20 is connected to the X input terminal of a divider 26. The Y input terminal of the divider 26 is connected to a rotation sensing circuit 24. The output terminal of the divider 26 is connected to the inverting input terminal of an amplifier 28. The noninverting input terminal of the amplifier 28 is connected to the inverting input terminal of the amplifier 20, and the output terminal is connected to the base of a PNP transistor Q18. A power source +Vcc is applied to the emitter of the transistor Q18 of which the collector is connected to the other end 1 of the motor 10.

The operation of the circuit shown in FIG. 2 will be described. Assume that the armature resistance between the terminals 1 and 2 of the motor 10 is R10, and R10 to R40 are selected so as to satisfy the following equation.

$$R10 \times R40 = R20 \times R30 \tag{3}$$

It is further assumed that the input impedance of the amplifiers 20 and 28, and the collector output impedance of the transistor Q18 are substantially infinite. The current Ia flowing into the resistors R10 to R40 due to the back electromotive force Ea of the motor 10 is $$Ia = Ea/(R10 + R20 + R30 + R40) \tag{4}$$

The potential of an inverted input signal E10 of the amplifier 20 and the potential of a noninverted input signal E12 are $$E10 = -IaR20 \tag{5}$$

$$E12 = IaR40 \tag{6}$$

An input level E12−E10 (difference signal) applied to the amplifier 20 is derived from the equations (4) and (6) and is given $$E12 - E10 = Ia(R20 + R40) = Ea(R20 + R40)/(R10 + R20 + R30 + R40) \tag{7}$$

Rearranging equation (7) by using the equation (3), we have $$E12 - E10 = Ea/(1 + R30/R40) = K3 \times Ea \tag{8}$$

where K3 denotes a constant given by $1/(1+R30/R40)$.

Assume now that the amplification factor of the amplifier 20 is A1. Since the difference signal E12−E10 in the equation (8) is inputted to the amplifier 20, the output signal of the amplifier 20, i.e. a first signal E20, is given $$E20 = A1 \times K3 \times Ea \tag{9}$$

The signal E20 is applied as a denominator X to the divider 26. A second signal Vo derived from the rotation sensor circuit 24 is used as a numerator Y of the divider 26. A detailed circuit arrangement of the circuit 24 will be described later. The divider 26 performs the division Y/X to produce a divided signal E26 which is given $$E26 = Vo/(A1 \times K3 \times Ea) \tag{10}$$

The signal E26 and the signal E10 are inputted to the amplifier 28. The amplifier 28 amplifies the signal difference E10−E26 to produce a third signal E28. The third signal E28 is applied to the base of the transistor Q18. The transistor Q18 supplies the motor 10 with a drive current $I_M$ having an amplitude inversely proportional to the potential of the signal E28.

The resistors R20 to R30 and the amplifier 20 make up a first circuit 22 for sensing a back electromotive force Ea of the motor 10 and providing the first signal E20. The rotation sensor circuit 24 constitutes a second circuit which senses a rotation speed N of the motor 10 to provide a second signal Vo. The divider 26 and the amplifier 28 constituted third circuit 30 which responds to the first and second signals E20 and Vo to provide the third signal E28. The transistor Q18 constitutes a fourth circuit 18 for feeding the drive current $I_M$ with an amplitude corresponding to the third signal E28 to the motor 10.

When the rotating speed N of the motor 10 increases from a given value, the back electromotive force Ea also increases (equation (1)). Then, the input signal E12−E10 to the amplifier 20 increases so that the first signal E20 to be used as a denominator X of the divider 26 is also increased (equations (8) and (9)). It is assumed that a rate of increase of the first signal E20 with the increase of N is larger than that of the second signal Vo used as the numerator Y of the divider 26, i.e. $\partial E20/\partial N > \partial Vo/\partial N$. With increase of the signal E20, the divided signal E26 decreases (equations (9) and (10)). As a result, the input signal E10−E26 to the amplifier 28 increases, so that the potential of the third signal E28 increases. When the potential of the signal E28 increases, the base current of the transistor Q18 decreases and the drive current $I_M$ also decreases. The decrease of the current $I_M$ reduces the rotation speed N of the motor 10. In this way, a shift of the rotation speed from a given value is cancelled.

As described above, the motor 10, the first circuit 22, the second circuit 24, the third circuit 30 and the fourth circuit 18 make up a closed negative feedback loop. In the negative feed back loop, when the amplification factor of the amplifier 28 is extremely large, the difference E10−E26 between the noninverted input level and the inverted input level to the amplifier 28 is reduced to be almost zero (a general nature of a negative feedback circuit with a high-degree feedback). At this time, the signals E10 and E26 are substantially equal to each other $$E10 = E26 \tag{11}$$

The equation (11) can be realized by using an operational amplifier (generally having a gain of 80 dB or more) for the amplifier 28.

Substituting the equations (5) and (10) into the equation (11), we have $$-Ia \cdot R20 = Vo/A1 \cdot K3 \cdot Ea \tag{12}$$

When the motor load is fixed, the amplitude of the drive current $I_M$ is proportional to the amplitude of the back electromotive force Ea and the amplitude of the current Ia is proportional to the amplitude of the back electromotive force Ea. Therefore, the current Ia is $$-Ia = K4 \times I_M \tag{13}$$

where K4 is a proportional constant. A negative sign of the current Ia designates a direction of the back electromotive force. When dividing the equation (1) by the equation (2), we have $$\frac{Ea}{T} = \frac{K1}{K2} \cdot \frac{N}{I_M} \cdot \frac{(H1 + H2 + H3)}{(H1 + H2 + H3)} = \frac{K1}{K2} \cdot \frac{N}{I_M}$$

Rearranging the above equation, Ea is $$Ea = (K1/K2)NT/I_M \tag{14}$$

Substituting the equations (13) and (14) into the equation (12) and rearranging the equation, we have $$V_o = A1 \cdot R20(K1 \cdot K3 \cdot K4/K2)NT \quad (15)$$
$$= K5 \times NT$$

where K5 is a constant given by $A1 \cdot R20(K1 \cdot K3 \cdot K4/K2)$. The equation (15) shows that the negative feedback loop makes the product NT of the rotating speed N and the output torque T proportional to the second signal Vo. Since the product NT indicates the output obtained from the motor 10, it can be said that the output NT of the motor 10 is automatically controlled on the basis of the second signal Vo.

When the rotation sensor circuit 24 produces the second signal Vo proportional to the rotating speed N of the motor 10, the following equation holds $$V_o = K6 \times N \quad (16)$$

where K6 is a proportional constant. When substituting the equation (16) into the equation (15), $$K6 \times N = K5 \times NT$$

hence, $$T = K6/K5 \quad \text{(constant)} \quad (17)$$

The equation (17) indicates that the output torque T is constant irrespective of the rotation speed N. In other words, the motor smoothly rotates being free from torque ripple, even if it rotates at any speed.

Figure 3:
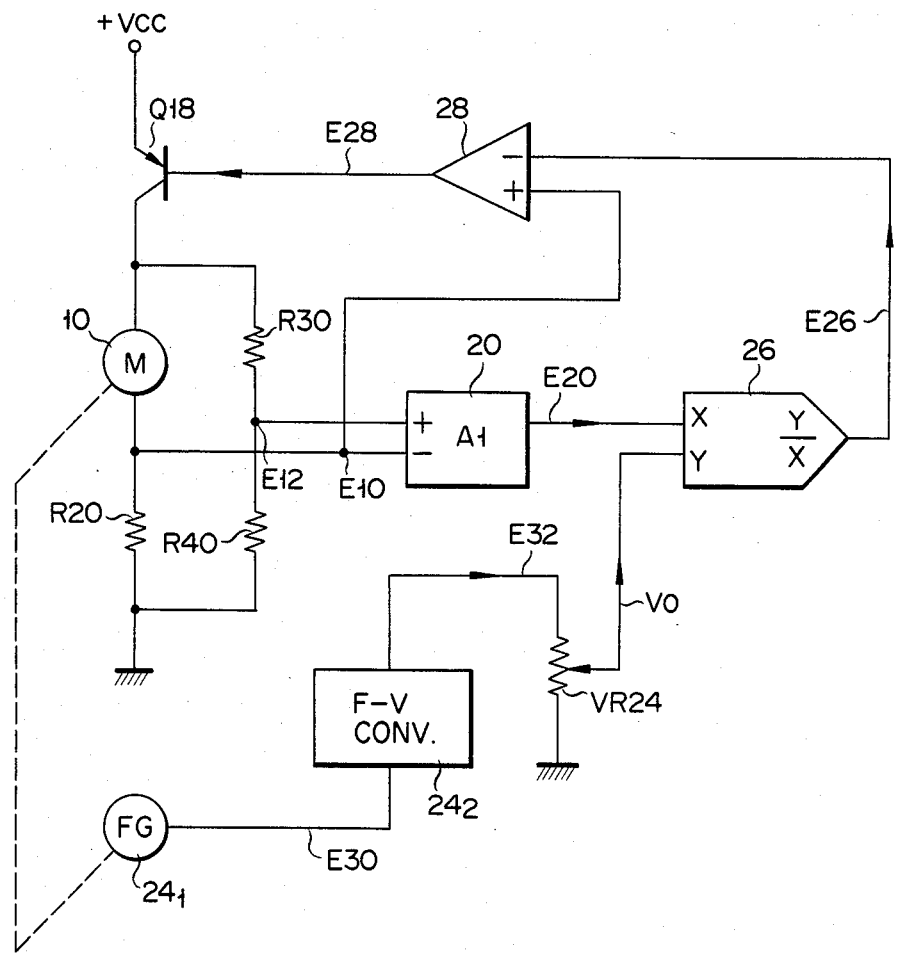
FIG. 3 shows a circuit diagram of a rotation detecting circuit used in the FIG. 2 circuit.

The equation (17) holds on the basis of the equation (16). FIG. 3 illustrates an example for satisfying the equation (16). In the figure, the motor 10 is coupled with a frequency generator $FG24_1$. An output signal E30 of the frequency generator $FG24_1$ is inputted to a frequency to voltage converter (or a DA converter) $24_2$. An output signal E32 of the converter $24_2$ is voltage divided by a variable resistor VR24 to be a second signal Vo. Since the frequency generator $FG24_1$ generates the output signal E30 at a frequency proportional to the rotation speed N of the motor 10, the second signal Vo is proportional to the rotation speed N. The variable resistor VR24 changes the amplitude of the second signal Vo. Accordingly, as seen from the equation (15), the output NT of the motor 10 can be adjusted by the variable resistor VR24.

When the output torque T of the motor 10 is sensed to provide the second signal Vo, the following relation holds $$V_o = K7 \times T \quad (16A)$$

where K7 is a proportional constant. Substituting the equation (16A) into the equation (15), we have $$K7 \times T = K5 \times NT$$

hence, $$N = K7/K5 \quad (17A)$$

The equation (17A) shows that the rotation speed N is fixed irrespective of the output torque T. In other words, if the second signal Vo is made proportional to the output torque T, a fixed rotation of the motor 10 is obtained, of which the speed can be changed properly.

Figure 4:
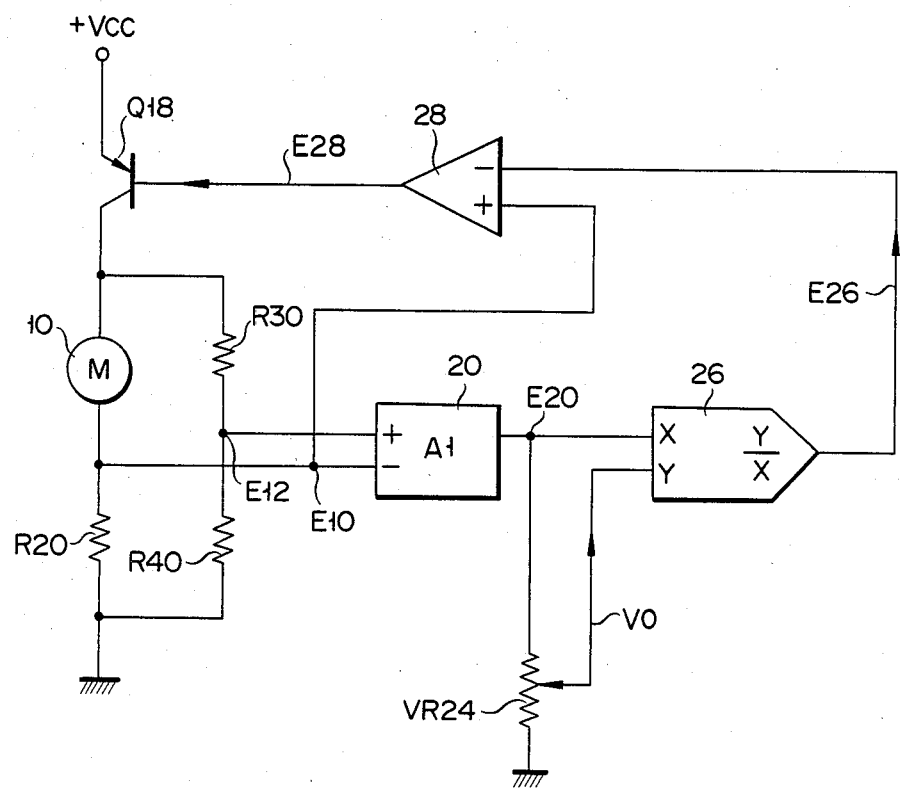
FIG. 4 is a circuit diagram of a modification of the FIG. 3 circuit.

FIG. 4 shows another example for satisfying the equation (16). The output terminal of an amplifier 20 is connected via a variable resistor VR24 to the Y input terminal of a divider 26. A first signal E20 derived from the amplifier 20 is proportional to a back electromotive force Ea of the motor 10 (equation (9)). The back electromotive force Ea is proportional to the rotating speed N of the motor 10 (equation (1)). A second signal Vo derived from the slider of the variable resistor VR24 is proportional to the rotation speed N (equation (16)). The output torque T (or the motor output NT) of the motor 10 can properly be set by the variable resistor VR24.

Figure 5:
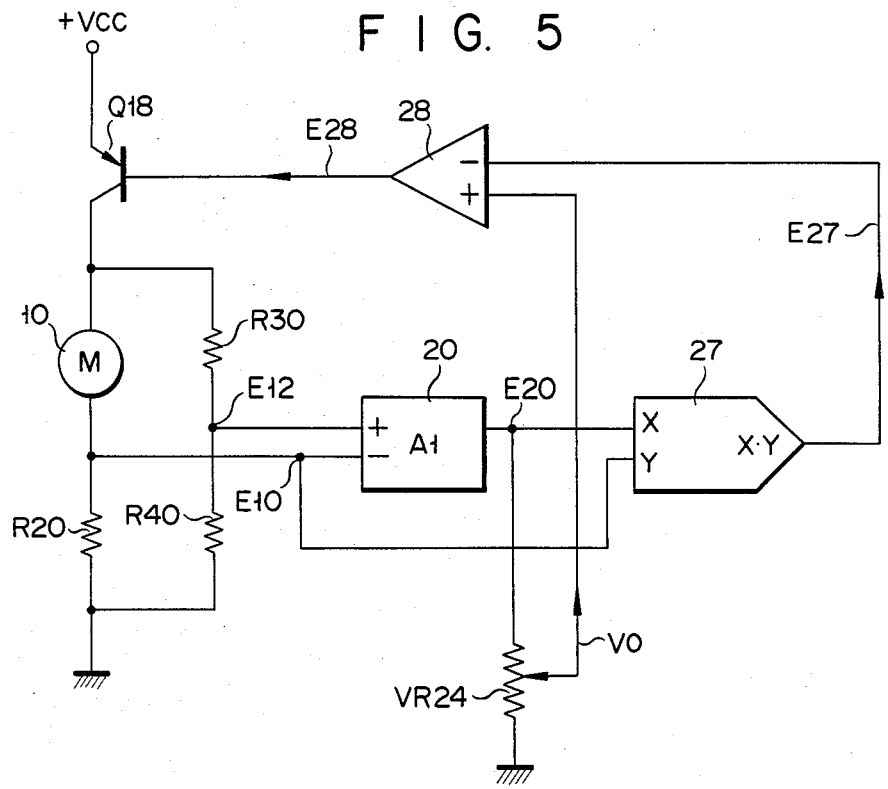

FIG. 5 shows a modification of the FIG. 2 embodiment. The output terminal of an amplifier 20 is connected to the X input terminal of a multiplier 27. The Y input terminal of the multiplier 27 is connected to the inverted input terminal of the amplifier 20, and its output terminal is connected to the inverted input terminal of an amplifier 28. The noninverted input terminal of the amplifier 28 is connected to the output terminal of the amplifier 20 via a variable resistor VR24.

The first and second signals E20 and E10 are applied to the X and Y input terminals of the multiplier 27, respectively. Then, the multiplier 27 produces a multiplied signal E27 as given by the following equation $$E27 = E10 \times E20 \quad (18)$$

From the equations (5) and (13), we see that $$E10 = K4 \times R20 \times I_M \quad (19)$$

Further, from the equations (9) and (14), we see $$E20 = A1(K1 \cdot K3/K2)NT/I_M \quad (20)$$

Substituting the equations (19) and (20) into the equation (18), the multiplied signal E27 is $$E27 = A1 \cdot R20(K1 \cdot K3 \cdot K4/K2)NT \quad (21)$$
$$= K8 \times NT$$

The negative feedback loop as referred to in FIG. 2 is also present in the FIG. 5 circuit. Through the negative feedback operation, the input signal level difference (Vo−E27) to the amplifier 28 infinitely approaches to zero. Then, the following equation holds $$V_o = E27 \quad (22)$$

Substituting the equation (21) into the equation (22), we have $$V_o = K8 \times NT \quad (23)$$

The equation (23) is identical in its form with the equation (15). Accordingly, also in the arrangement of FIG. 5, the output NT of the motor 10 can be controlled by the second signal Vo. According to the FIG. 5 arrangement, as in the case of the FIG. 4 arrangement, the second signal Vo is proportional to the rotation speed N of the motor 10. Therefore, the equation (16) is satisfied, and the output torque T of the motor 10 can be fixed irrespective of the rotating speed.

The discusstion given above relates to the case where no load variation for the motor is taken into account. If the load is fixed, the motor output NT necessary for a desired rotation speed N may be constant. In order to obtain a fixed rotation speed N independently of the load variation, change of output NT with the variation of the load is required. Thus, it is necessary to change the second signal Vo according to the load variation for the speed control of the motor, as seen from the equation (15). This can be realized by rotating the variable resistor VR24 according to the load variation or by replacing the resistor VR24 by an AGC circuit provided that the AGC circuit is controlled according to the load variation.

FIG. 6 shows an arrangement for changing the second signal Vo according to the load variation for the motor 10. One end 2 of the motor 10 is connected to the inverted input terminal of an amplifier 32 through a reference voltage $V_N$ for the speed regulation. The noninverted input terminal of the amplifier 32 is connected to the other terminal 1 of the motor 10 via a resistor R50, and is grounded through a resistor R60. A filter capacitor 34 for removing ripples is connected between one end 2 of the motor 10 and a connecting node of the resistors R50 and R60. The output terminal (low impedance) of the amplifier 32 is connected to a given constant voltage source Vr having a low impedance through resistors R70 and R80. The second signal Vo is obtained from a connection point between the resistors R70 and R80.

Assume that the load for the motor 10 increases and the rotation speed decreases. The back electromotive force Ea of the motor 10 decreases and the potential of the signal E10 rises (equations (1), (4) and (5)). Then, the positive phase input voltage for the amplifier 32 increases, so that the output voltage Vs becomes also high. When the output voltage Vs becomes high, the second signal Vo corresponding to the numerator Y of the division Y/X is also high. Then, the potential level of the divided signal E26 rises, and the potential of the third signal E28 drops. As a result, drive current $I_M$ increases and the output torque T increases (equation (2)), and then the output NT of the motor 10 becomes also large. The increase of the output cancels the decrease of the rotating speed N due to the increase of the load. At the start of the motor 10, since N is small (almost zero), Vs is high. Conversely, when the motor output NT is too large, Vs is low.

Where it is assumed that the current flowing from the amplifier 32 to the resistors R70 and R80 is Ir, then the following relationships hold $$Vs = Vo + Ir \cdot R70 \qquad (24)$$

$$Ir = (Vs - Vr)/(R70 + R80) \qquad (25)$$

Substituting the equation (25) into the equation (24) and arranging the equation, we have $$Vs = -R70/R80 \cdot Vr + (1 + R70/R80)Vo \qquad (26)$$

Figure 7:
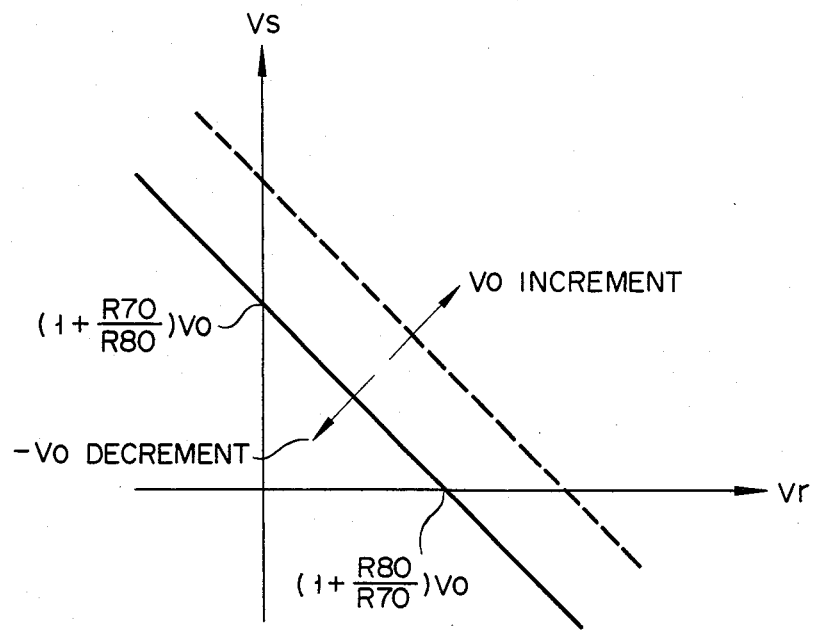
FIG. 7 shows a graphical representation illustrating a variation of a second signal Vo with respect to a change in a load of the circuit arrangement shown in FIG. 6.

The graphical expression of the equation (26) is as indicated by a solid line in FIG. 7. The solid line, when the second signal Vo increases, shifts toward a broken line, while keeping a fixed inclination of −R70/R80.

In FIG. 6, when R30=R50, R40=R60 and $V_N=0$, the difference input to the amplifier 20 is equal to the difference input to the amplifier 32.

From this, it is seen that the amplitude of the output Vs of the amplifier 32 has a magnitude proportional to the output signal E20 of the amplifier 20, i.e.

$|Vs| \propto |E20|$. From the equations (1) and (9), we see that the output signal E20 is $$E20 = A1 \cdot K1 \cdot K3(H1 + H2 + H3)N \propto N \qquad (27)$$

Accordingly, the output Vs is $$Vs = K9 \times N \qquad (28)$$

where K9 is a proportional constant corresponding to the coefficient $A1 \cdot K1 \cdot K3(H1+H2+H3)$ in the equation (27).

In the arrangement of FIG. 6, a motor output sensing system containing the resistors R20 to R40 and the amplifier 20, and motor speed sensing system containing the resistors R20, R50 to R80 and the amplifier 32 coexist. A share of the motor output control to the motor speed control is determined by the resistors R70 and R80 and the voltage Vr. For example, when R70/R80 is infinite, $Vr = Vo = K5 \times NT$ is held (equation (15)) and the output control is performed. Where R70/R80=0, then $Vo = Vs = K9 \times N$ (equation (28)) and the speed control is performed. When $0 < R70/R80 < \infty$, Vo is a function to the parameters N and NT.

It should be understood that the present invention is not limited to the above-mentioned embodiments disclosed in the specification and the accompanying drawings, but may be variously modified and changed within the scope of the present invention. The motor 10 is not limited to the 3-phase Y connection DC motor, although such motor is preferable for the present invention. Any motor is applicable for the present invention, if it is of the type in which the back electromotive force Ea is generated by the rotation of the rotor and its output torque T is proportional to the drive current $I_M$. While the fourth circuit 18 is a constant current source of the collector drive type in the above-mentioned embodiments, any circuit may be used for the fourth circuit, if it can feed the drive current $I_M$ with an amplitude corresponding to the third signal E28. The bridge circuit containing the motor 10 for sensing the back electromotive force Ea of the motor may be substituted by any other arrangement. For example, in FIG. 3, a signal corresponding to the back electromotive force Ea can be obtained from the output E30 of the $FG24_1$. The rotating speed of the motor may be sensed by using a Hall element for sensing a change in a magnetic field developed by the rotation of the motor.

The divider 26 and the multiplier 27 may be of either the digital or analog type. The operation accuracy of the divider may be not so strict in a practical use. Therefore, it is permitted to use an analog divider (or multiplier) using a simple logarithmic converter, a subtractor (or adder) and an exponential converter. The variable resistor VR24 shown in FIG. 3, for example, may be substituted by an electronic level attenuator circuit using an FET or a photocoupler being formed of an LED and a CdS cell whose internal resistance is controlled by a given control signal applied to the LED.

What is claimed is:
1. A motor apparatus comprising:
   motor means for providing a rotating motion with a given output torque and at a given rotating speed, said motor means generating a back electromotive force with a magnitude corresponding to said rotating speed;
   first means coupled to said motor means for sensing said back electromotive force to provide a first signal with a magnitude corresponding to said electromotive force;

second means coupled to said motor means for sensing the rotating motion of said motor means to provide a second signal with a magnitude corresponding to said rotating motion;

third means coupled to said first and second means and being responsive to said first and second signals, for providing a third signal with a magnitude corresponding to said first and second signals;

said third means including:

divider means responsive to said first and second signals for dividing said second signal by said first signal to provide a divided signal representing a ratio of said first signal to said second signal; and a first circuit having inputs coupled to said motor means and to said divider means, and for providing at an output thereof said third signal with a magnitude corresponding to a potential difference between a potential corresponding to said back electromotive force and a potential of said divided signal; and fourth means coupled to said motor means and to said output of said first circuit of said third means for providing a drive current to said motor means, said drive current having a magnitude corresponding to said third signal, the kinetic energy of the rotating motion of said motor means being derived from said drive current; and wherein said motor means, said first means, said second means, said third means and said fourth means are coupled to form a negative feedback loop for setting up a proportional relationship of said second signal to the product of said rotating speed and said output torque, and said second means changes said second signal proportionally to said rotating speed.

2. The apparatus of claim 1, wherein:

said motor means includes first and second terminals for providing said back electromotive force, said first terminal of said motor means being coupled to said fourth means to receive said drive current; and said first means includes:

a first impedance element coupled at one end to the first terminal of said motor means;

a second impedance element coupled at one end to the second terminal of said motor means;

a third impedance element connected between the other end of said first impedance element and the other end of said second impedance element, a current with a magnitude corresponding to said back electromotive force flowing through said first to third impedance elements, thereby to produce a first potential at the other end of said first impedance element and a second potential at said one end of said second impedance element; and a second circuit coupled to the other end of said first impedance element and to said one end of said second impedance element, for providing said first signal with a magnitude corresponding to a potential difference between said first potential and said second potential.

3. The apparatus of claim 1 or 2, wherein said motor means includes a DC motor comprising Y-connection armature windings.

4. The apparatus of claim 3, wherein said fourth means includes current source means responsive to said third signal for producing said drive current.

5. The apparatus of claim 1 or 2, wherein said fourth means includes current source means responsive to said third signal for producing said drive current.

6. The apparatus of claim 1 or 2, wherein said second means includes:

a frequency generator coupled to said motor means for generating a frequency signal indicating the given rotation speed (N) of said motor means;

an F-V converter coupled to said frequency generator for converting said frequency signal into a voltage signal having a potential corresponding to the frequency of said frequency signal; and adjustment means coupled to said F-V converter and to said divider means, for adjusting the potential of said voltage signal and providing the adjusted potential at said second signal to said divider means.

7. The apparatus of claim 1 or 2, wherein said second means includes:

circuit means coupled to said motor means for detecting said electromotive force to generate a detected signal whose potential corresponds to the magnitude of said electromotive force; and potential shift means coupled between a given fixed potential circuit and said divider means for shifting the potential of said detected signal and providing the shifted potential as said second signal to said divider means.

8. A motor apparatus comprising:

motor means for providing a rotating motion with a given output torque and at a given rotating speed, said motor means generating a back electromotive force with a magnitude corresponding to said rotating speed;

first means coupled to said motor means for sensing said back electromotive force to provide a first signal with a magnitude corresponding to said back electromotive force;

second means coupled to said first means for sensing the rotating motion of said motor means to provide a second signal with a magnitude corresponding to said rotating motion;

third means coupled to said first and second means and being responsive to said first and second signals, for providing a third signal with a magnitude corresponding to said first and second signals;

said third means including:

divider means responsive to said first and second signals for dividing said second signal by said first signal to provide a divided signal representing a ratio of said first signal to said second signal; and a first circuit having inputs coupled to said motor means and to said divider means, and for providing at an output thereof said third signal with a magnitude corresponding to a potential difference between a potential corresponding to said back electromotive force and a potential of said divided signal; and fourth means coupled to said motor means and to said output of said first circuit of said third means for providing a drive current to said motor means, said drive current having a magnitude corresponding to said third signal, the kinetic energy of the rotating motor of said motor means being derived from said drive current; and wherein said motor means, said first means, said second means, said third means and said fourth means are coupled to form a negative feedback loop for setting up a proportional relation of said second signal to the product of said rotating speed and said output torque, and said second means changes said second signal proportionally to said rotating speed.

9. The apparatus of claim 8, wherein:
said motor means includes first and second terminals for providing said back electromotive force, said first terminal of said motor means being coupled to said fourth means to receive said drive current; and
said first means includes:
  a first impedance element coupled at one end to the first terminal of said motor means;
  a second impedance element coupled at one end to the second terminal of said motor means;
  a third impedance element connected between the other end of said first impedance element and the other end of said second impedance element, a current with a magnitude corresponding to said back electromotive force flowing through said first to third impedance elements, thereby to produce a first potential at the other end of said first impedance element and a second potential at said one end of said second impedance element; and
  a second circuit coupled to the other end of said first impedance element and to said one end of said second impedance element, for providing said first signal with a magnitude corresponding to a potential difference between said first potential and said second potential.

10. The apparatus of claim 8 or 9, wherein said motor means includes a 3-phase Y-connection type DC motor.

11. The apparatus of claim 10, wherein said fourth means includes current source means responsive to said third signal for producing said drive current.

12. The apparatus of claim 8 or 9, wherein said fourth means includes current source means responsive to said third signal for producing said drive current.

13. A motor apparatus comprising:
motor means for providing a rotating motion with a given output torque and at a given rotating speed, said motor means generating a back electromotive force with a magnitude corresponding to said rotating speed;
first means coupled to said motor means for sensing said back electromotive force to provide a first signal with a magnitude corresponding to said back electromotive force;
second means coupled to said first means for sensing the rotating motion of said motor means to provide a second signal with a magnitude corresponding to said rotating motion;
third means coupled to said first and second means and being responsive to said first and second signals, for providing a third signal with a magnitude corresponding to said first and second signals;
said third means including:
  multiplier means responsive to said first and second signals for multiplying said second signal by said first signal to provide a multiplied signal representing the product of said first signal and said second signal; and
  a second circuit coupled to said second means and to said multiplier means for providing said third signal with a magnitude corresponding to a potential difference between a potential corresponding to said second signal and a potential of said multiplied signal; and
fourth means coupled to said motor means and to said output of said first circuit of said third means for providing a drive current to said motor means, said drive current having a magnitude corresponding to said third signal, the kinetic energy of the rotating motion of said motor means being derived from said drive current; and
wherein said motor means, said first means, said second means, said third means and said fourth means are coupled from a negative feedback loop for setting up a proportional relationship of said second signal to the product of said rotating speed and said output torque, and said second means changes said second signal proportionally to said rotating speed.

14. The apparatus of claim 13, wherein:
said motor means includes first and second terminals for providing said back electromotive force, said first terminal of said motor means being coupled to said fourth means to receive said drive current; and
said first means includes:
  a first impedance element coupled at one end to the first terminal of said motor means;
  a second impedance element coupled at one end to the second terminal of said motor means;
  a third impedance element connected between the other end of said first impedance element and the other end of said second impedance element, a current with a magnitude corresponding to said back electromotive force flowing through said first to third impedance elements, thereby to produce a first potential at the other end of said first impedance element and a second potential at said one end of said second impedance element; and
  a second circuit coupled to the other end of said first impedance element and to said one end of said second impedance element, for providing said first signal with a magnitude corresponding to a potential difference between said first potential and said second potential.

15. The apparatus of claim 13 or 14, wherein said motor means includes a 3-phase Y-connection type DC motor.

16. The apparatus of claim 15, wherein said fourth means includes current source means responsive to said third signal for producing said drive current.

17. The apparatus of claim 13 or 14, wherein said fourth means includes current source means responsive to said third signal for producing said drive current.

* * * * *

UNITED STATES PATENT AND TRADEMARK OFFICE
CERTIFICATE OF CORRECTION

PATENT NO. : 4,510,423

DATED : April 2, 1985

INVENTOR(S) : Teruo IWASAWA

It is certified that error appears in the above-identified patent and that said Letters Patent is hereby corrected as shown below:

Column 1, line 19, "with torque ripple" should read
--the torque ripple--.

Column 3, line 62, "R30" should read --R40--;
last line, "constituted third" should read
--constitutes a third--.

Signed and Sealed this

Fourth Day of February 1986

[SEAL]

Attest:

DONALD J. QUIGG

Attesting Officer

Commissioner of Patents and Trademarks